J. P. SPICER.
SAFETY AND EMERGENCY ATTACHMENT FOR TIRES.
APPLICATION FILED JUNE 28, 1921.
1,404,802.
Patented Jan. 31, 1922.
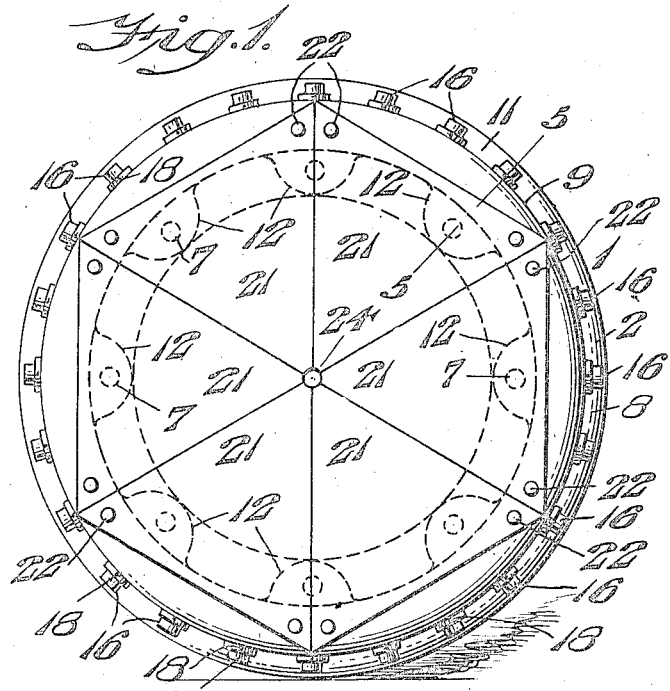
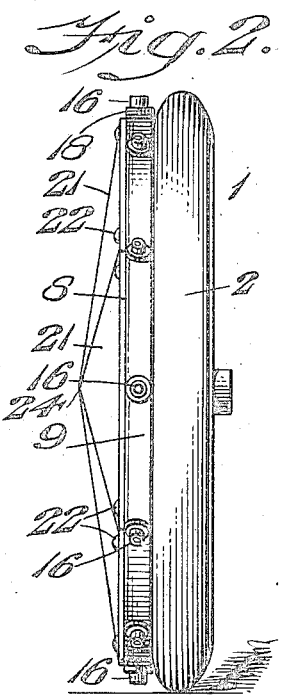
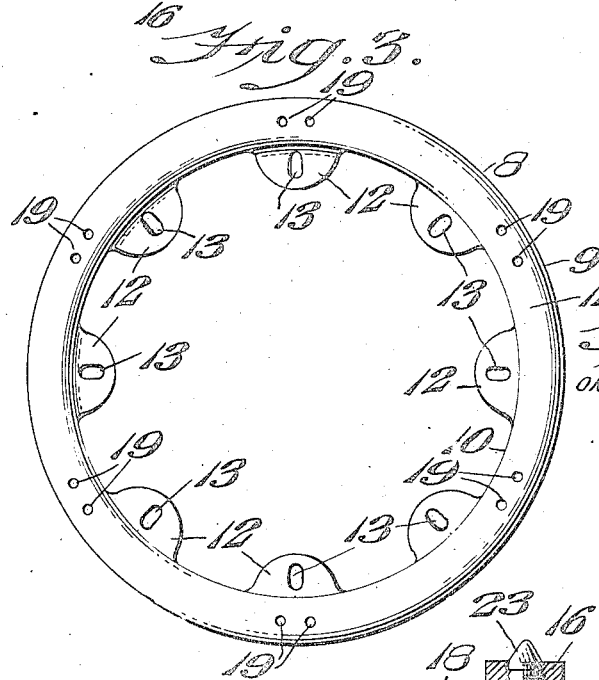
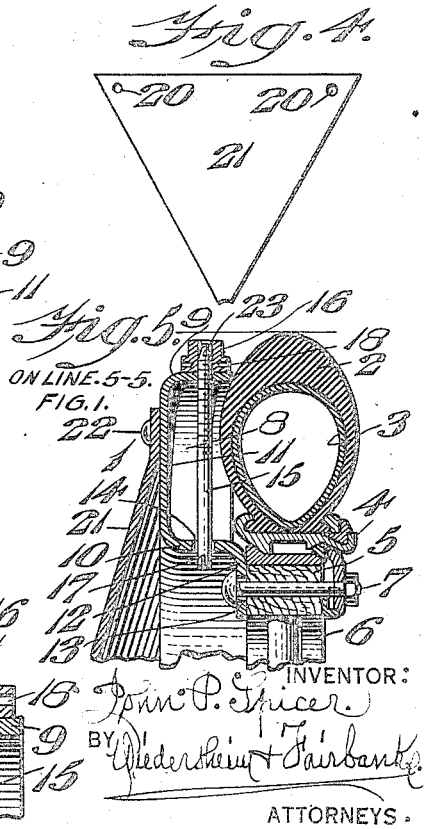
INVENTOR:
John P. Spicer.
BY Wiedersheim & Fairbanks
ATTORNEYS.

UNITED STATES PATENT OFFICE.

JOHN P. SPICER, OF PHILADELPHIA, PENNSYLVANIA, ASSIGNOR OF ONE-FOURTH TO ALBIN H. CORNOG AND ONE-FOURTH TO ADELAIDE V. ENGLE CORNOG, BOTH OF PHILADELPHIA, PENNSYLVANIA.

SAFETY AND EMERGENCY ATTACHMENT FOR TIRES.

1,404,802.   Specification of Letters Patent.   Patented Jan. 31, 1922.

Application filed June 28, 1921. Serial No. 481,008.

*To all whom it may concern:*

Be it known that I, JOHN P. SPICER, a citizen of the United States, residing in the city and county of Philadelphia, State of Pennsylvania, have invented a new and useful Safety and Emergency Attachment for Tires, of which the following is a specification.

My invention consists of a novel construction of a safety and emergency attachment for tires or wheels of automobiles and the like, wherein I have provided a novel device adapted to be connected or associated with a vehicle wheel bearing or carrying a pneumatic tire of any conventional type, whereby in case of the disabling or deflation of the tire or inner tube my device will instantly become operative to relieve the tire from contact with the ground and will permit the auxiliary or emergency attachment to function in the capacity of the disabled wheel or tire, so as to permit the vehicle to continue to its destination or to the nearest point where the disabled or deflated tire or inner tube can be repaired.

To the above ends, my invention consists of a novel construction of an open sided ring or annulus adapted to be attached to the felly or other part of the vehicle wheel and provided with radially extending bolts or threaded stems having nuts thereon, whose outer ends are normally slightly below the outer periphery or tread of the juxtaposed tire, means being provided whereby my novel device can be readily attached to vehicle wheels of any conventional type and means being further provided by the employment of triangular or other shaped plates for closing the exterior of my device and preventing the ingress of dirt, dust, mud or the like to the operative parts of my device.

My invention further consists of other novel features of construction, all as will be hereinafter fully set forth.

For the purpose of illustrating my invention, I have shown in the accompanying drawings a form thereof which is at present preferred by me, since it will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a side elevation of a safety emergency attachment for tires or vehicle wheels, embodying my invention.

Figure 2 represents an end view of Figure 1.

Figure 3 represents a side elevation of the annulus or ring employed in detached position.

Figure 4 represents a plan view of one of the triangular or polygonal plates employed.

Figure 5 represents on an enlarged scale a section on line 5—5 of Figure 1.

Figure 6 represents on an enlarged scale a vertical sectional view of certain of the parts seen in Figure 5, showing another adaptation of my invention.

Similar numerals of reference indicate corresponding parts.

Referring to the drawings:—

1 designates my novel construction of safety emergency attachment for deflatable tires or vehicle wheels, wherein 2 designates a tire or outer shoe of any conventional type having an inner tube 3, the above parts being secured to a rim 4 which is retained upon the felly 5 of the vehicle wheel 6 by any suitable or conventional fastening means, as the bolt 7 and its adjuncts.

8 designates the annulus or body of my novel device, the same comprising an open-sided ring having the outer annular wall 9, the inner annular wall 10 and the outer side wall 11, said inner wall 10 having the inwardly projecting ears 12, provided with the bolt holes 13 through which the bolts 7 pass, whereby said annulus or body 8 is held in juxtaposition to the tire or shoe 2 and the wheel 6, as is evident.

The annulus or body 8 has the portion opposite to the side wall 11 open, as will be understood from Figure 5, and its inner wall 10 is provided at regular intervals with the openings 14 through which pass the threaded stems 15, the outer threaded end of each of the latter engaging the internally threaded nut 16. The inner ends of the stems 15 are provided with slots 17 for the application thereto of a screw driver or other implement, and the nuts 16 may be provided with the seats 18 for the insertion of a pin or suitable implement to hold or turn said nuts with respect to their threaded stems 15. The outer side wall 11 of the body or annulus 8 is provided with the threaded openings 19 into which cap bolts, screws or other fastening devices 22 are adapted to be screwed, said screws passing through the openings 20 in the triangular or polygonal shaped thin plates 21, so that said plates when assembled will appear as seen in Figures 1 and 2 and give an ornamental appearance to the entire device.

The outer ends of the threaded stems 15 are provided with the conical or spur like terminals 23, so that in icy or slippery weather, the stems 15 can be screwed outwardly to the extent indicated in Figure 6, so that the spurs 23 will contact with the ice or ground and thereby give the wheels the desired traction.

The manner of assembling my device will be readily apparent, it being understood that the annulus or body 8 is secured to the felly or wheel proper by means of the bolts 7 passing through the holes 13. The threaded stems 15 are then placed in position as seen in Figure 5 and the nuts 16 are screwed on the outer threaded ends thereof.

The holes 14 may be slightly larger than the stems 15 which latter are in threaded engagement with the outer wall 9. The triangular or polygonal thin metal plates 21, which may be dished or flared outwardly as seen in Figures 2 and 5 are then secured in position by the screws or cap bolts 22 and the parts now appear as seen in Figures 1, 2 and 5, the function of the plates 21 being to form a finish and closure for the outer portion of the device. The stems 15 are preferably normally threaded into the nuts 16 to about the extent seen in Figure 5, and the thickness of the nuts 16 is preferably such that the outer ends of said nuts will be normally preferably within the outer periphery or tread of the tire 2, as will be understood from Figure 5, whereupon it will be seen that in case of a puncture of the inner tube 3 or deflation thereof, the outer ends of the nut 16 will then function and the weight of the vehicle will be removed from the deflated or disabled tire or shoe and the driver will thus be enabled to proceed to his destination or to the nearest garage, where the necessary repairs can be made to the inner tube or the shoe.

It will be apparent that my device can be cheaply manufactured and readily secured in place without necessitating the employment of skilled labor and there will be no injury done to the tire or shoe or inner tube in case of deflation, since the weight will be carried upon the annulus or body 8 and the nuts carried thereby.

If desired the inner portions or ends or apices of the triangular plates 21, at the point 24, see Figures 1 and 2, may be provided with a button, bolt or other form of clamping device for holding said plates in juxtaposition, said device being omitted for the sake of clearness of illustration.

It will now be apparent that I have devised a novel and useful safety and emergency attachment for tires which embodies the features of advantage enumerated as desirable in the statement of the invention and the above description, and while I have, in the present instance, shown and described a preferred embodiment thereof which will give in practice satisfactory and reliable results, it is to be understood that such embodiment is susceptible of modification in various particulars without departing from the spirit or scope of the invention or sacrificing any of its advantages.

Having thus described my invention, what I claim as new and desire to secure by Letters Patent, is:

1. In a device of the character stated, an annular body provided with an outer, inner and side wall, the inner portion of said body juxtaposed to the tire being open, means for securing said body to a vehicle wheel and threaded stems passing through said outer and inner walls and having external nuts thereon.

2. In a device of the character stated, an annulus provided with an outer, inner and side wall, the inner portion of said annulus juxtaposed to the tire being open, means for securing said annulus to a vehicle wheel, and threaded stems passing through the outer and inner walls of said annulus and having nuts thereon, said stems having their outer ends pointed.

3. In a device of the character stated, an annulus provided with an outer, inner and side wall, the inner portion of said annulus juxtaposed to the tire being open, means for securing said annulus to a vehicle wheel, threaded stems passing through the outer and inner walls of said annulus and in threaded engagement with said outer wall and having nuts thereon, and polygonal shaped plates having their outer portions secured to the outer wall of said annulus.

4. In a device of the character stated, the combination of a vehicle wheel, a deflatable tire thereon, an outer annulus concentric with said tire and provided with outer, inner and side walls, openings in said outer and inner walls, threaded stems radially disposed in said openings, and nuts mounted on the outer threaded ends of said stems, the outer ends of said nuts being positioned on said annulus normally within the outer periphery of said tire, said annulus being provided with slotted ears, and bolts common to said ears and vehicle wheel.

5. In a device of the character stated, the combination of a vehicle wheel, a deflatable tire thereon, an outer annulus concentric with said tire and provided with outer, inner and side walls, openings in said outer and inner walls, threaded stems radially disposed in said openings, and nuts mounted on the outer threaded ends of said stems, the outer ends of said nuts being positioned on said annulus normally within the outer periphery of said tire, said annulus being provided with slotted ears, and bolts common to said ears and vehicle wheel, in combination with plates secured to said annulus and forming a closure and finish for the device.

JOHN P. SPICER.

Witnesses:
E. HAYWARD FAIRBANKS,
ALBIN H. CORNOG.